US00RE47005E

(19) United States
(12) Reissued Patent
Archibald et al.

(10) Patent Number: US RE47,005 E
(45) Date of Reissued Patent: Aug. 21, 2018

(54) TRANSIENT SUPPRESSION FOR BOOST REGULATOR

(71) Applicant: INTERSIL AMERICAS LLC, Milpitas, CA (US)

(72) Inventors: Nicholas Ian Archibald, San Francisco, CA (US); Allan Richard Warrington, Kent (GB)

(73) Assignee: INTERSIL AMERICAS LLC, Milpitas, CA (US)

(21) Appl. No.: 14/688,921

(22) Filed: Apr. 16, 2015

Related U.S. Patent Documents

Reissue of:
(64) Patent No.: 8,421,364
Issued: Apr. 16, 2013
Appl. No.: 12/492,755
Filed: Jun. 26, 2009

U.S. Applications:
(60) Provisional application No. 61/080,947, filed on Jul. 15, 2008.

(51) Int. Cl.
*H05B 37/02* (2006.01)
*H05B 33/08* (2006.01)

(52) U.S. Cl.
CPC ..... *H05B 33/0827* (2013.01); *H05B 33/083* (2013.01)

(58) Field of Classification Search
USPC ..... 315/209 R, 185 R, 224, 225, 291
See application file for complete search history.

(56) References Cited

U.S. PATENT DOCUMENTS 5,867,379 A * 2/1999 Maksimovic et al. ..... 363/89
6,465,993 B1 * 10/2002 Clarkin ..... H02M 3/156 323/272

(Continued)

FOREIGN PATENT DOCUMENTS

CN 1909048 2/2007
JP H07192879 7/1995

(Continued)

OTHER PUBLICATIONS

Taiwan Patent Office, "Office Action from TW Application No. 103118759 dated Oct. 1, 2015", , pp. 1-7, Published in: TW.

(Continued)

*Primary Examiner* — Angela M Lie
(74) *Attorney, Agent, or Firm* — Foley & Lardner LLP

(57) ABSTRACT

A circuit for generating an output voltage to a top node of a plurality of LED strings. The circuit includes an inductor having a load current flowing therethrough and a switching transistor responsive to a switching control signal. An integrator generates a compensation voltage responsive to a voltage at a bottom node of the LED string and a reference voltage. Circuitry for combining [an] *a correction* offset with the compensation voltage is responsive to the compensation voltage and the load current through the inductor. [The offset is generated only during a step load change of the load current and substantially reduces voltage transients from the compensation voltage and the output voltage.] A summation circuit sums the compensation voltage including the *correction* offset with at least the voltage at the bottom node of the LED string to generate a first control signal. A latch generates the switching control signal responsive to the first control signal and a leading edge blanking signal.

27 Claims, 8 Drawing Sheets

(56) References Cited

U.S. PATENT DOCUMENTS

| | | | | |
|---|---|---|---|---|
| 7,560,917 | B2 * | 7/2009 | Ho | H02M 3/158 323/285 |
| 2006/0186827 | A1 * | 8/2006 | Ragonesi et al. | 315/185 S |
| 2007/0182346 | A1 * | 8/2007 | Shteynberg et al. | 315/308 |
| 2008/0067993 | A1 * | 3/2008 | Coleman | 323/282 |

FOREIGN PATENT DOCUMENTS

| | | | |
|---|---|---|---|
| JP | 2005117810 | | 4/2005 |
| KR | 1020050006042 | | 1/2005 |
| KR | 1020080063012 | | 7/2008 |
| TW | 200822800 | | 5/2008 |
| WO | 2006097328 | | 9/2006 |
| WO | 2006097328 | A2 | 9/2006 |

OTHER PUBLICATIONS

U.S. Patent and Trademark Office, "Notice of Allowance", "From U.S. Appl. No. 12/492,755", dated Jan. 18, 2013, pp. 1-9, Published in: US.

U.S. Patent and Trademark Office, "Office Action", "from U.S. Appl. No. 12/492,755", dated Jan. 19, 2012, pp. 1-13, Published in: US.

U.S. Patent and Trademark Office, "Office Action", "from U.S. Appl. No. 12/492,755", dated Jul. 20, 2012, pp. 1-7, Published in: US.

* cited by examiner

TRANSIENT SUPPRESSION FOR BOOST REGULATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. application Ser. No. 12/492,755, filed Jun. 26, 2009, which* claims *the benefit of* priority from U.S. Provisional *Application* Ser. No. 61/080,947, filed Jul. 15, 2008, and entitled [MUTLI-CHANNEL] *MULTI-CHANNEL* LED DRIVER, *the specification of* which is incorporated herein by reference *in its entirety*.

BRIEF DESCRIPTION OF THE DRAWINGS

For a more complete understanding, reference is now made to the following description taken in conjunction with the accompanying Drawings in which.

DETAILED DESCRIPTION

Figure 1:
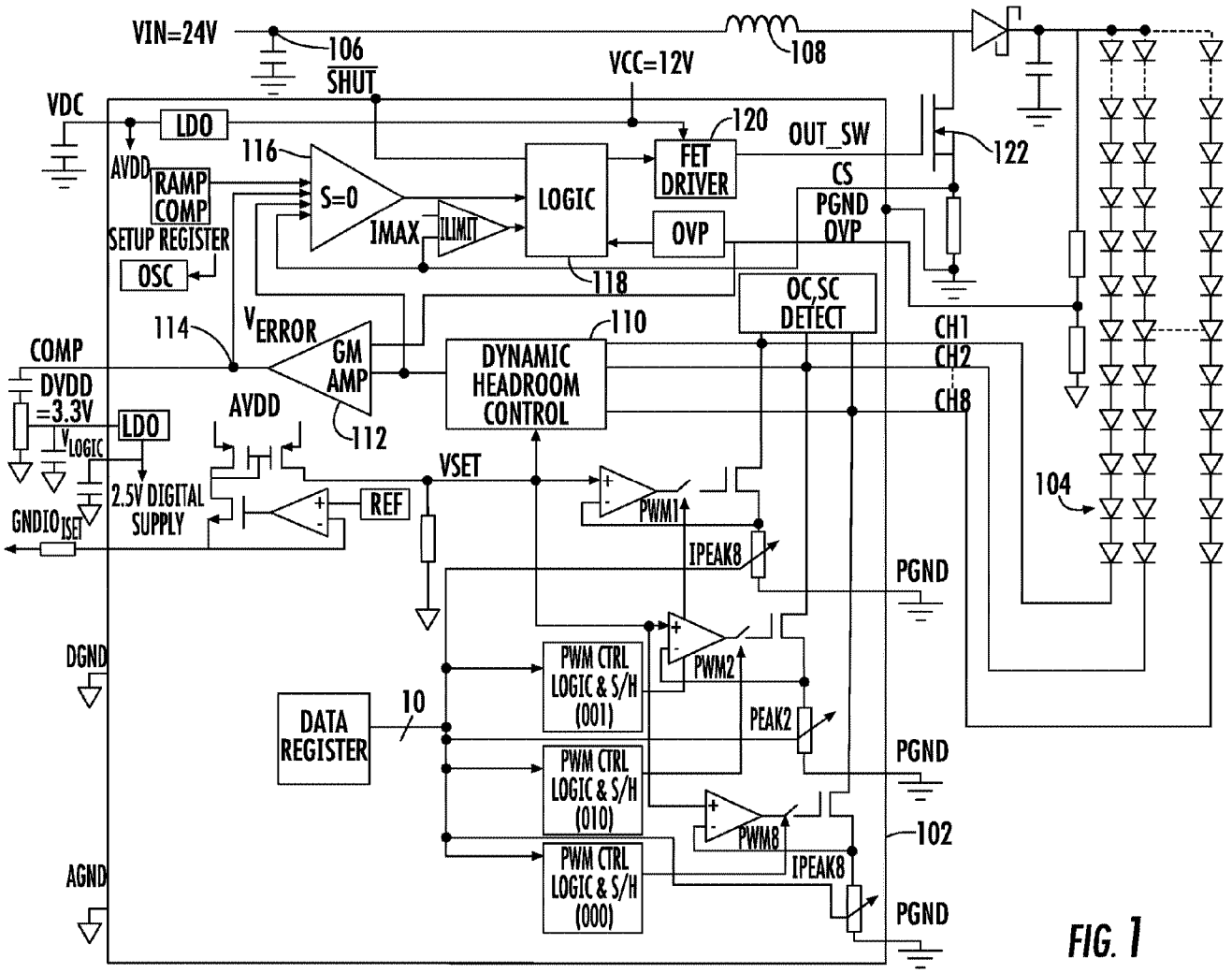
FIG. 1 is a block diagram of an LED driver circuit.

Referring now to the drawings, wherein like reference numbers are used herein to designate like elements throughout, the various views and embodiments of DYNAMIC HEADROOM CONTROL FOR LED DRIVER are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

LED drivers are used for driving LEDs in various applications. Multi channel LED drivers may be used for driving multiple strings (i.e., channels) of LEDs for use in various applications such as backlighting. Existing LED drivers may have problems providing sufficient headroom for the LED strings and may also experience excessive transients within the output of switching converters within the LED driver due to changes in load currents.

Referring now to the drawings, and more particularly to FIG. 1, there is illustrated a block diagram of one embodiment of an LED driver 102. The LED driver 102 is connected to drive multiple LED strings 104. The driver 102 of FIG. 1 controls eight channels of LED current to enable the LED strings 104 to be used for LCD backlight applications. The drive voltage for the LED strings is regulated from an input voltage node 106 by switching the current in an inductor 108. The drive voltage is provided to the top of each LED string 104. Voltages at the bottom of each LED string 104 are monitored by Dynamic Headroom Control block 110 to determine the voltage at the bottom of each string. Amplifier 112 generates a COMP voltage at node 114 responsive to voltage information from the feedback stack connected to the pot-down from the drive voltage fed into the OVP block. The COMP voltage from node 114 along with other information are input to a summation circuit 116 that provides a control output to control logic 118 for controlling the FET driver circuitry 120 controlling the operation of a switching transistor 122 which in turn regulates LED drive voltage by controlling the current in the inductor 108.

Figure 2:
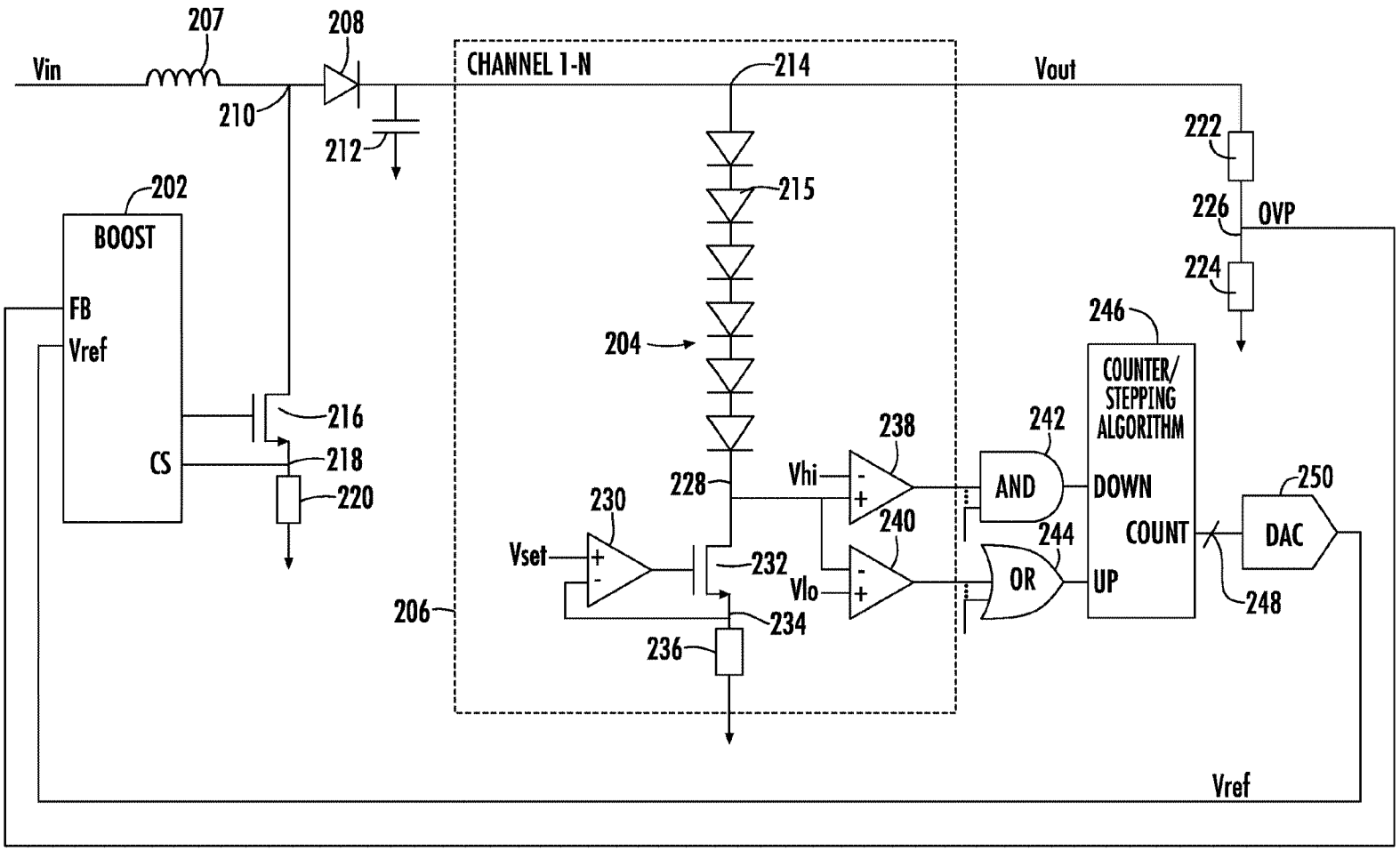
FIG. 2 illustrates is a simplified block diagram more fully illustrating circuitry for implementing dynamic headroom control within an LED driver circuit.

Referring now to FIG. 2, there is illustrated a simplified block diagram of the circuitry used for providing dynamic headroom control within the LED driver 102. Within the LED driver 102, multiple channels of LED strings 204 are operated using a boost controller 202 and a boost converter (including components 202, 207, 208, 212, 216, 218, and 220) to generate a voltage that is applied to the top of several stacks of series LED strings 204 which are each connected in parallel to a separate current source at the bottom end of the LED string 204. While the illustration in FIG. 2 only presents a single LED string 204 connected with the boost converter, in operation multiple LED strings 204 are connected with the boost converter such that multiple iterations of the circuit block 206 would exist, one for each LED string. The input voltage $V_{IN}$ is applied to a first side of an inductor 207. The other side of the inductor 207 is connected to an anode of diode 208 at node 210. A capacitor 212 is connected between the cathode of diode 208 and ground. The cathode of diode 208 is connected to the top of the LED string 204 at node 214. A switching transistor 216 has its drain/source path connected between node 210 and node 218. The gate of transistor 216 receives drive signals from the boost controller 202. Node 218 is connected to the current sense (CS) input of the boost controller 202. A resistor 220 is connected between node 218 and ground.

The top of the LED string at node 214 comprises an output voltage node $V_{OUT}$ which is connected to a resistor divider consisting of resistors 222 and 224. Resistor 222 is connected between node 214 and node 226. Resistor 224 is connected between node 226 and ground. A voltage measurement is taken at node 226 (from the pin usually used for over voltage protection purposes) and provided to the boost regulator 202 as a feedback voltage $V_{FB}$. The LED string 204 consists of a plurality of individual LEDs 215 which are connected in series between node 214 and node 228. A current source is provided at the bottom of the LED string at node 228. The current source consists of an amplifier 230 connected to receive a reference voltage VSET at the non-inverting input. The voltage VSET is used to set the current. The output of the amplifier 230 is connected to a transistor 232 having its drain/source path connected between node 228 and node 234. The other input of amplifier 230 is connected to node 234. The inverting input of amplifier 230 is connected to node 234. A resistor 236 is connected between node 234 and ground. The disclosed embodiment comprises one example of the current source. However, other implementations of the current source may be used.

The voltage generated at node 228 is applied to the non-inverting input of comparators 238 and inverting input of comparator 240. The inverting input of comparator 238 is connected to receive a reference voltage $V_{HIGH}$. The non-inverting input of comparator 240 is connected to receive a reference voltage $V_{LOW}$. The output of comparator 238 is connected to one input of an AND gate 242. The remaining inputs of AND gate 242 would be connected to the outputs of the comparator 238 from each of the other channels associated with each of the other circuit blocks 206. Similarly, the output of comparator 240 is connected to one input of an OR gate 244. The remaining inputs of OR gate 244 would be connected to the outputs of the comparators in each of the other channels from circuit block 206. The output of AND gate 242 is provided to the DOWN input of counter/stepping algorithm 246. The output of OR gate 244 is connected to the UP input of the counter/stepping algorithm 246. The counting/stepping algorithm 246 generates a count value via bus 248 that is input to a digital-to-analog converter 250. The digital-to-analog converter 250 generates an output analog value that is used as the reference voltage $V_{REF}$ that is applied back to the boost regulator circuitry 202.

The multi-channel LED configuration using a boost/buck switching regulator generates a single voltage at node 214 to drive the top of a plurality of series LED strings 204. Each of the series stacks of LED strings 204 are connected in parallel to a separate current source at the bottom node 228. This allows a savings in circuit hardware by sharing the switching regulator between multiple LED strings 204. This configuration drives a large number of LEDs without requiring excessively high voltages. However, the voltages must be carefully regulated to eliminate power dissipation in the current sources which will cause thermal problems and limit overall circuit efficiency. As the voltage of the LEDs are variable (with process, temperature and aging effects), previous implementations of these systems have used the voltage at the output of the current sources at node 228 as a feedback point for the regulator allowing the regulator to be adaptive and move the optimum operating level. This minimizes power dissipation due to the voltage drop across the current source. Typically this is done by passing the analog voltages at the bottom of each LED string 204 to a control block which picks out the lowest voltage level from each of the LED strings and passes this selected voltage on as the feedback voltage. This feedback voltage is regulated to a level which has been defined such that the current sources will have sufficient headroom not to be pushed in a linear region of operation (typically several hundred millivolts). This works well when all LED strings are running with the same pulse width modulated (PWM) dimming signal, as whenever any string is conducting, all strings are conducting. This means that real time information is available on which string has the lowest voltage at all times when the boost voltage regulator is switching.

However, for systems where different PWM dimming signals are used for different channels, it is possible for there to be no time when all channels are conducting at once. It would be possible to regulate on the basis of only those channels that are conducting at a given point in time, resulting in a switching regulator output voltage level which varies as different channels turn on and off. However, this solution provides a poor output voltage transient response resulting in short current pulses being noticeably compressed in situations where there is a mismatch between strings.

If, for example, all LED strings 204 have the same conducting voltage, except for one which needs one volt more, and the LED string is only turned on for a 490 nanosecond pulse every 500 microseconds (as would be the case with the lowest dimming signal in a 10-bit PWM dimming scheme running on a 2 KHz PWM frequency), the boost regulator 202 would have to respond in substantially less than this time. It is not practical to build the boost regulator 202 for such an application that has a transient response that is dynamically faster than 490 nanoseconds. In practice, the response time will be a period of tens to hundreds of microseconds, which is far too slow. This means that the boost regulator 202 will miss the 490 nanosecond period when the circuit requires extra head room, which in turn is likely to mean that the current source has insufficient headroom and that the 490 nanosecond current pulse will not reach its intended peak current. This compression of current will cause a corresponding reduction of the brightness of the LED string, for the lower PWM duty cycles and strings with higher forward voltages than other strings in the system. The implementation described with respect to FIG. 2 uses a different approach to determine the switching regulator output voltage provided by the boost voltage regulator 202.

The voltage window between the reference voltages $V_{HIGH}$ and $V_{LOW}$ is set to be larger than the smallest single step that can be introduced onto the boost regulator output voltage node 214 by the control scheme, guaranteeing that at least one output level will obtain a stable operating point. The voltage control is achieved by regulating the output voltage of the boost regulator 202 to a reference voltage input $V_{REF}$ that is generated from the digital-to-analog converter (DAC) 250. The counter/stepping algorithm 246 controls the reference voltage provided by the DAC 250 to cause the voltage at the bottom of a lowest voltage node of the plurality of LED strings 204 to remain between the high reference voltage and the low reference voltage The DAC 250 output can be moved up and down to the required level by digital control signals provided from the counter/stepping algorithm 246 to the required level by a digital control scheme based upon information gained from monitoring the channel voltages at the bottom of each LED string 204. The OVP signal monitored at node 226 is used as the feedback signal for the boost regulator 202, which is regulated to the voltage level dictated by the reference voltage provided from the DAC 250. This provides the correct voltage for the LED string 204 with the highest forward voltage requirement no matter how short the time a particular LED string is conducting. Additionally, stability is improved over systems which take the boost feedback from the bottom of the LED strings, as the phase shift that would normally be introduced into the feedback path due to the interaction with the current source transient response and LED characteristics is eliminated from the control loop.

The DAC 250 is configured such that successive changes get larger and larger (up to a maximum step size limit) in order to reach a target point, unless the output remains constant for longer than a certain time or changes direction. Any subsequent changes will be small to allow for minor fluctuations in the level required for temperature variations in the forward voltage of the LEDs, and those caused by noise in the system. The control algorithm is optimized to enable the output voltage to fall faster than it can rise as if the output voltage is too high, it can quickly cause thermal problems for the LED driver.

The LED driver monitors the switching regulator output voltage at node 226 to prevent the reference voltage $V_{REF}$ from being changed if the boost regulator has not caught up with the target reference value and generates an output voltage responsive to the reference voltage. This prevents the reference voltage from "running away" from the required value and taking a long time to come back in line once the boost regulator 202 has caught up. This is particularly important when the boost regulator 202 output voltage is dropping. This is due to the fact that the boost regulator 202 can produce a very fast rise in the output voltage, but the only way to reduce the output voltage is to allow the current source to discharge the output capacitor during its normal conduction time. This can take a significant amount of time to lower the output voltage if the LED duty cycles are very low. Thus, the system will not allow the reference voltage to be changed upwards if the feedback of the output level is significantly below the current reference voltage and will not allow the reference voltage to be changed downwards if the feedback of the output level is significantly above the current reference voltage. The configuration also provides over voltage protection without requiring additional circuitry as there is a maximum DAC code above which the boost regulator 202 will not go. This level can be modified by changing the pot down ratio to the pin.

Figure 3:
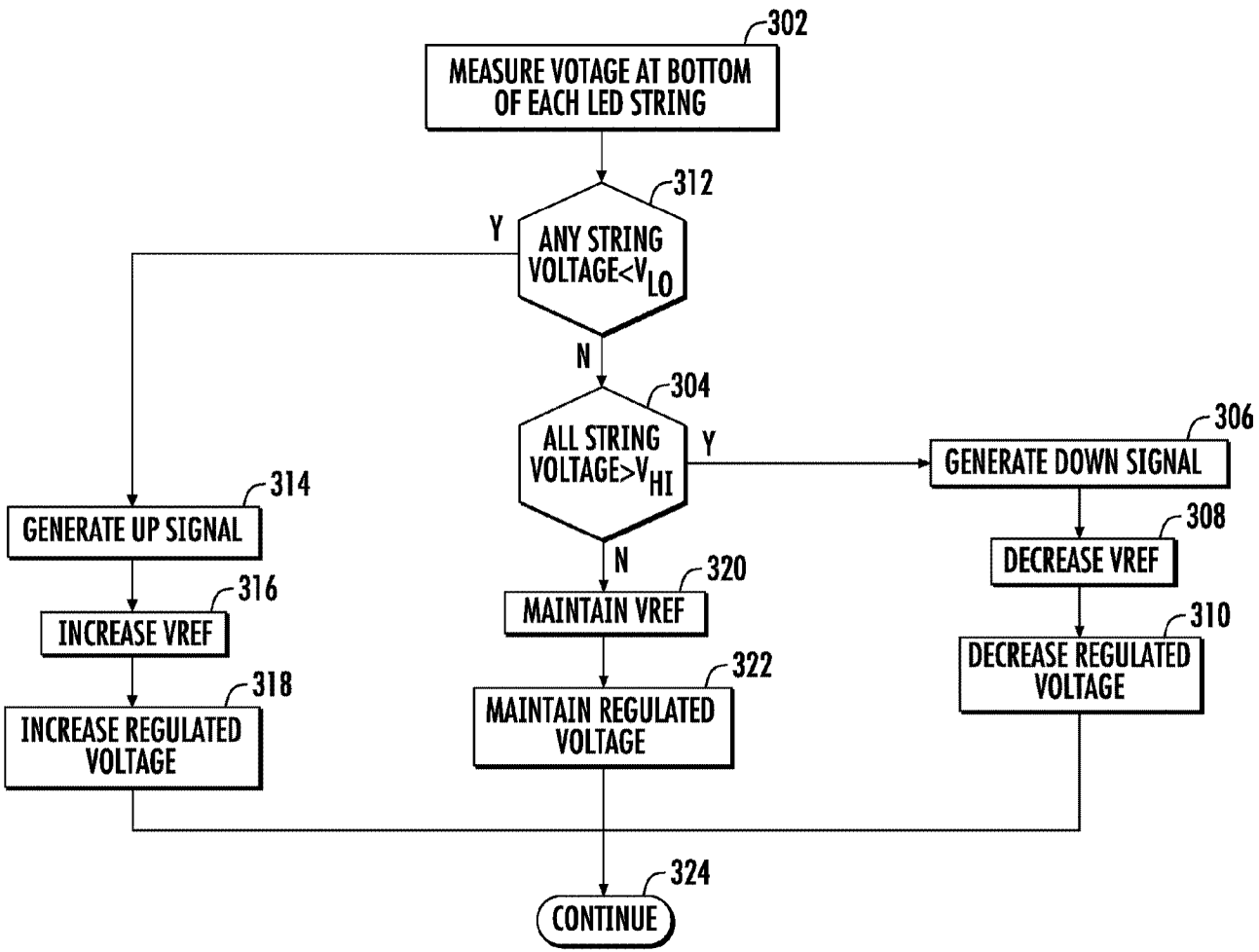
FIG. 3 is a flow diagram describing the operation of the circuit of FIG. 2.

Referring now to FIG. 3, there is illustrated a flow diagram describing the operation of the circuit of FIG. 2. Voltage information is measured at step 302 at the bottom of each LED string 204 at node 228. This information is not fed to the boost regulator 202 in real time as feedback to the FB pin. Instead, the output voltage at node 214 is monitored through the voltage divider circuit consisting of resistors 222 and 224. The feedback voltage to the FB pin is provided from node 226 of the resistor divider. A voltage window is created between the reference voltages $V_{HIGH}$ and $V_{LOW}$ using comparators 238 and 240. Using these two comparators 238 and 240, the circuit attempts to regulate the lowest channel voltage on an LED string during conduction of the LED string. If inquiry step 312 determines if at least one of the voltages at node 228 is below a reference voltage $V_{LOW}$ during conduction, this causes the associated comparator 240 on that channel to go to a logical "high" level which drives the output of OR gate 244 to a logical "high" level generating an UP signal at step 314. The logical "high" signal at the output of OR gate 244 causes the counter/stepping algorithm 246 and DAC 250 to increase the reference voltage $V_{REF}$ at step 316. The increased reference voltage $V_{REF}$ causes a corresponding increase at step 318 of the regulated voltage provided by the boost regulator 202.

If inquiry step 312 determines that none of the voltages at node 228 of the LED strings fall below the referenced voltage $V_{LOW}$, inquiry step 304 determines whether during the entire PWM period all channels associated with each LED string 204, except those channels which are completely turned off (i.e., 0% PWMs/disabled), were conducting at least once and whether all channels had a voltage at the bottom of its LED string that was above $V_{HIGH}$ during conduction. If so, the regulated voltage is reduced by the counter/stepping algorithm 246. In this circumstance, the output of the comparator 238 would be at a logical "high" level for each LED string being driven by the LED driver, and these signals would drive the output of the AND gate 242 to a logical "high" level generating the DOWN signal at step 306. Responsive to the DOWN signal, the reference voltage $V_{REF}$ is decreased by the counter/stepping algorithm 246 and DAC 250 at step 308. The reduced reference voltage provided by the DAC 250 will cause a corresponding decrease in the regulated voltage provided at node 214 by the boost regulator 202 at step 310.

If inquiry step 304 determines that all channel voltages at node 228 are not above the reference voltage $V_{HIGH}$ for the entire PWM period, at least one of the voltages at nodes 228 is within the established voltage window, and the reference voltage is maintained at step 320. This causes the regulated voltage to be maintained at the established level at step 322. The process continues at step 324 and returns back to step 302 to continue monitoring the voltage at the bottom of each LED string at node 228.

Figure 4:
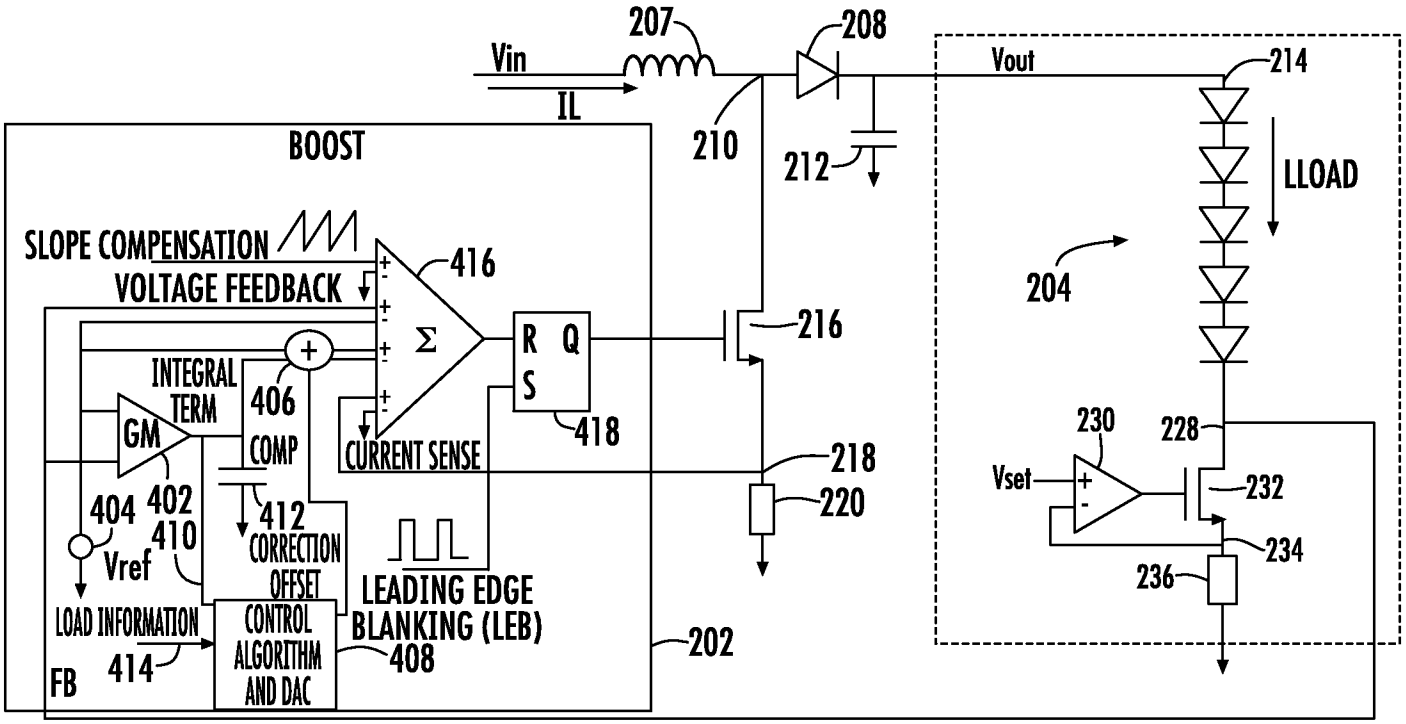
FIG. 4 is a simplified block diagram more fully describing the manner for transient suppression within the boost converter of the LED driver.

Referring now to FIG. 4, there is more particularly illustrated an alternative embodiment the circuitry within the boost regulator 202 for providing transient suppression within the output voltage $V_{OUT}$ provided from node 210. The boost regulator 202 transients at known steps can be dramatically reduced by adding an offset to the COMP voltage $V_{COMP}$ at the same time the load current IL through inductor 207 changes. The COMP voltage $V_{COMP}$ is provided from the output of an integrator 402. Addition of the offset to the output of the integrator 402 saves the integrator 402 from having to settle to a new value, and the resulting over/under current delivered to the output during the settling time. This configuration however does not change the basic loop properties in each load condition. The integrator 402 receives the feedback voltage FB from node 228, at the bottom of LED stack 204, although it can also be configured as in FIG. 2. Additionally, the integrator 402 receives at a second input a reference voltage $V_{REF}$ 404. The output of the integrator 402 is connected to an adder circuit 406 and a control algorithm and DAC 408 through node 410. Also connected to node 410 is a capacitor 412 connected between node 410 and ground.

The control algorithm and DAC 408 generates a correction offset that is added with the COMP voltage provided from the output of the integrator 402 to dramatically reduce the boost transients as described herein above. The control algorithm and DAC 408 generates the correction offset responsive to the provided COMP voltage and provided load information provided from control input 414. The load information would comprise the load current through inductor 207. The COMP voltage including the correction offset is provided to the inputs of a summation circuit 416. Also provided as input to the summation circuit 416 are a slope compensation ramp signal, the feedback voltage $V_{FB}$, the reference voltage $V_{REF}$, the voltage monitored at node 218 at the source of switching transistor 216 and connections to system ground. The output of the summation circuit 416 is provided as a control output to the R input of a latch circuit 418. The latch circuit 418 also receives at its S input, a leading edge blanking signal (LEB). The leading edge blanking signal is a fixed frequency clock signal with a very low duty cycle (short "HIGH" time) which set the 418 flip flop. It can be used as a leading edge blanking signal, as well, if the flip flop 418 is set dominant. The flip-flop 418 generates at its Q output drive signals to the switching transistor 216.

In a switching regulator 202, when a proportional control scheme is used, load regulation is very poor. Any increase in the load current through inductor 207 that is above the conduction point of the inductor 207 will result in a corresponding decrease in the output voltage $V_{OUT}$. However, while the response to a load step causes a change in the output voltage level, the time taken to settle to the new voltage level is very fast. In an integral system, extra gain at low frequencies is used to eliminate most of this load regulation characteristic. This is at the expense of a fast transient response, as the system can only respond to a transient with a bandwidth defined by the integrator gm and loop filter (COMP) network impedance. This means that a step increase in the load current will cause an initial output voltage fall followed by a correction. Likewise, when a load is reduced in a step, the initial transient is in a positive direction. The larger the load current transient, the larger the corresponding output transient. These scenarios are more fully illustrated in FIG. 5.

Figure 5:
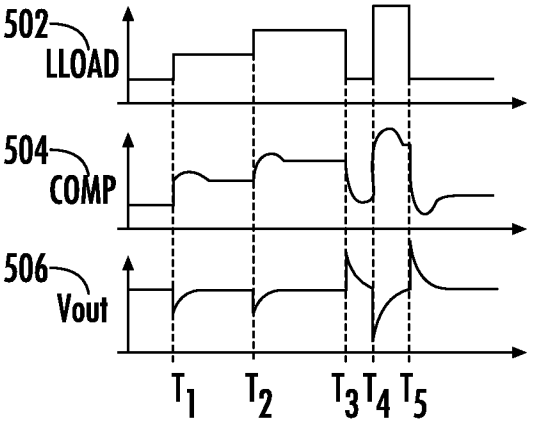
FIG. 5 illustrates the boost transients created by changes in the load at the output of the LED driver.

Referring now to FIG. 5, there are illustrated the changes in the load current 502, the compensation voltage 504 and the output voltage 506 over a period of time. As can be seen, when there is a step increase in the load current 502 at times $T_1$, $T_2$ and $T_4$, a corresponding transient increase in the COMP voltage 504 occurs before the COMP voltage settles to a steady state level. Responsive to the COMP voltage 504, the output voltage $V_{OUT}$ goes through a transient spike decrease, until the output voltage settles back to the regulated voltage level. Also, when there is a step decrease in the load current 502, the COMP voltage reacts with a corresponding decrease, and the regulated output voltage $V_{OUT}$ 506 incurs a transient spike increase prior to settling back to the regulated voltage levels. These load transients can be dramatically reduced by adding the offset from the control algorithm and DAC 408 to the COMP voltage at adder 406 at the same time as the load changes as indicated by the load information provided at input 414. This saves the integrator 402 from having to settle to a new feedback voltage level and the resulting over/under current delivery to the output during the settling time. The configuration has the added benefit of not changing the basic loop properties in each load condition.

There is a component in these transients illustrated in FIG. 5 that is caused by the time taken to ramp the inductor current $I_L$ UP or down to a new value that is difficult to correct for. However, this is not the dominant term. The implementation illustrated in FIG. 4 applies to systems where the load is known, and it is possible to correct for the remainder of the change. This is particularly relevant to a circuit including multi-string LED drivers where there are a known set of discrete possible loads. Any load regulation or transient spike characteristics in such systems have the potential to cause increased power dissipation in the LED driver and also may push the current sources into their linear regions of operations. The latter condition requires that a system must either be designed to give enough headroom in the current sources, such that these events do not push them into their linear region of operation, thus increasing on-chip power dissipation or, alternatively, accepting poor LED current control that will result from many transitions into the linear region.

For example, if the circuit is designed to drive 8 stacks of LEDs, there exists 9 possible load conditions. These load conditions are 0 amps (all stacks off), $I_{LED}$ (one stack conducting), 233 $I_{LED}$ (two stacks conducting), . . . $8\times I_{LED}$ (all 8 stacks conducting). Thus, over the course of operation, a control term specific to each of these load conditions may be provided. The control scheme related to the circuit of FIG. 4 attempts to provide an input to the loop that reduces the amount of voltage shift required to the integrator output node. This allows the integral control to be kept in the loop while eliminating the main component to the transient voltage event.

This may be accomplished by the control algorithm and DAC 408 in a number of ways. In a first embodiment, a simple scheme uses a gain term that amplifies the input to the loop defined by the integrator 402. Given that the integral term is proportional to the inductor current $I_L$ (beyond the continuous conduction point), the gain may be varied to attempt to reduce the total range of the integrator 402 output over the range of possible load currents. In an LED driver system which uses PWM controls to dim the LEDs, a differential gain can be applied to each possible load combination (0 to N LED strings conducting), providing a much reduced integrator output swing, and therefore smaller voltage transients. This can be based on calculations of the inductor current at the time of design or simulation based, where a gain is picked via simulations that show the characteristics of the integrator output during the various load conditions. In non LED systems where the load is known but has many more states than is practical to implement discretely, the gain term can be continuous with a relationship between load and gain developed to best fit the application. This probably will not give a perfect fit, but so long as the total integrator range is reduced, the transient response is improved.

In an alternative embodiment, a more complex scheme can be used with discrete load steps. The integrator output can be monitored and make use of a digital control scheme to attempt to pull the output value to a known level. For example, the integrator output voltage goes up in response to a higher load current, and the system will add a contribution to the loop via the digital-to-analog controller (DAC) within block 408 to try and bring down the output voltage. Similarly, a contribution is removed from the loop when the output voltage goes down in order to attempt to bring it back up to a desired level. The latest digital-to-analog controller code used can be stored for each possible load level and applied at the start of any condition where the particular load is presented. In this manner, the system can build up and use a stored predetermined set of offset values as inputs to the loop to limit the range of the integrator output and minimize output voltage transients. The advantage of this method over the first alternative is that the effective gain of the integrator term in the loop does not change with load level and proportional control can still be carried out by use of a resistor in series with the compensation capacitor without providing varying proportional gains of the load current.

Figure 6:
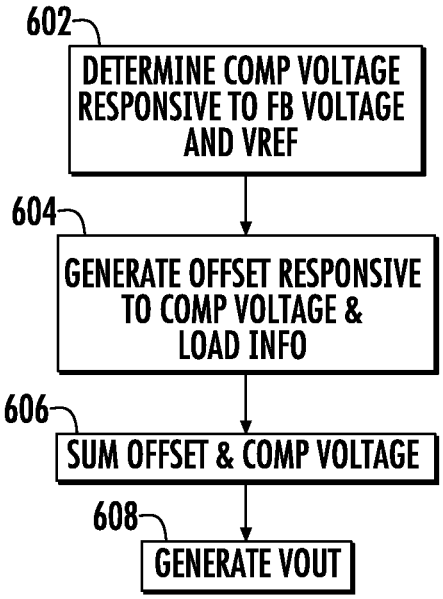
FIG. 6 illustrates the manner in which the circuitry of FIG. 4 suppresses the boost transients responsive to a change in the inductor load current.

Referring now to FIG. 6, there is illustrated a flow diagram describing the operation of the boost regulator 202 utilizing the described control algorithm. Initially, at step 602 a determination is made of the compensation voltage responsive to the FB voltage and the $V_{REF}$ voltage by the integrator 402. The control algorithm within block 408 determines a control offset value responsive to the provided compensation voltage and the load information as indicated by the number of LED strings 204 conducting. The generated offset control value controls the digital-to-analog converter within the control block 408 to generate the correction offset analog voltage which is added at step 606 to the compensation voltage within the adder circuit 406. The offset compensation voltage is used in generating the output voltage through the summation circuit 416 and latch 418 that generate the switching control signals controlling at step 608 the output voltage $V_{OUT}$ at node 210.

Figure 7:
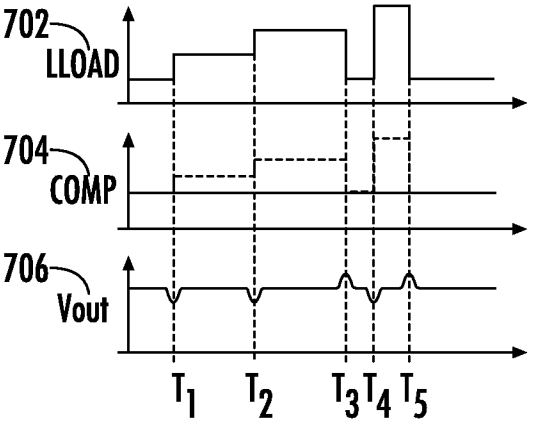
FIG. 7 is a flow diagram describing the operation of the circuitry for suppressing the boost transients.

Referring now to FIG. 7, there is illustrated the load current $I_L$ 702, the COMP voltage 704 and the output voltage $V_{OUT}$ 706 for a system using the boost transient suppression method described herein above. As described previously, the load current increases at times $T_1$, $T_2$ and $T_4$. Unlike in the wave forms illustrated with respect to FIG. 5, the COMP voltage 704 settles very quickly as the levels are very close to the previous levels due to the added COMP voltage offset. Consequently, within the output voltage signal $V_{OUT}$ 706 only small transient voltage spikes remain which are caused by the time taken to ramp the inductor current to the new level. A similar situation can be seen in cases where the load current is stepped down at times $T_3$ and $T_5$. Comparisons between the illustrations in FIGS. 5 and 7 illustrate the significant transient suppression provided by the use of the correction offset with the voltage compensation signal.

Figure 8:
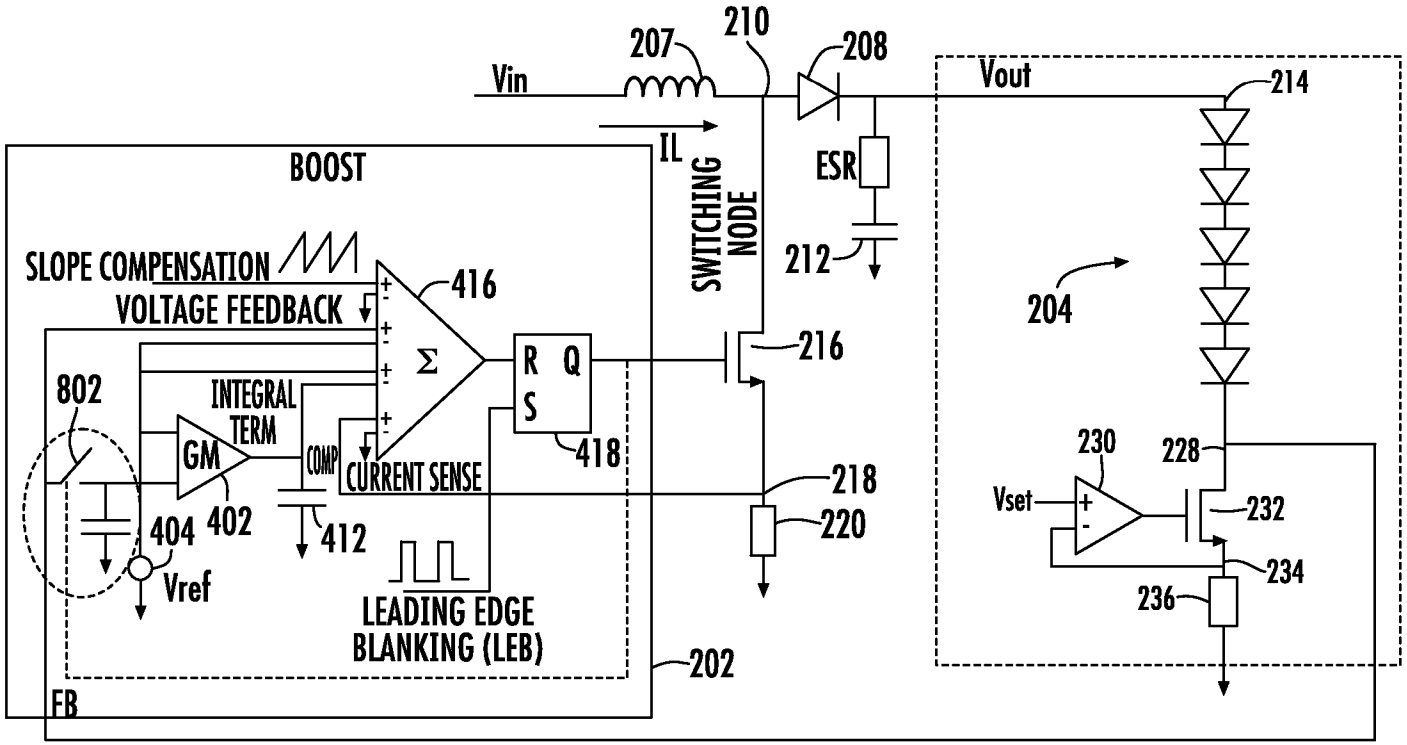
FIG. 8 is a simplified block diagram illustrating the manner for providing boost ripple rejection within the LED driver.

Referring now to FIG. 8, there is illustrated the manner in which the boost regulator 202 may be configured to provide ripple rejection. Integral control is included within the DC/DC controller loops via the integrator 402 as described previously to improve absolute accuracy while maintaining a smaller output capacitor than would be required by the same accuracy in equivalent proportional control schemes. The voltage ripple on the DC/DC output is defined by a number of factors including $V_{IN}$, $V_{OUT}$, $I_{LOW}$, I inductor value, output capacitance and output capacitance capacitor effective series resistance. These are related via the following equations:

Duty cycle $D=(V_{out}-V_{in})/V_{out}$

Avg inductor current ILavg (average)=Iload*Vout/(Vin*efficiency)

Peak inductor current ILpeak=ILavg+$V_{in}$/L*D*T*0.5 (for continuous system)

Capacitor ripple current Iripple=ILpeak

Capacitor ripple voltage Vripple=ESR*ILpeak

In a given system, where most of these terms are defined, the important figures for defining ripple are the peak inductor current which is defined by the load current and other factors, and the output capacitor ESR. In high voltage applications such as an LED driver where many LEDs are connected in series, the type of capacitors used to obtain the required output capacitances can have a relatively high ESR. This can provide high level output ripple. The operation of the integral control scheme will mean that the average value of this ripple wave form will be regulated to the required level. For most applications this is acceptable. However, LED driver systems attempt to regulate the voltage at the top of an LED string such that the voltage at the bottom is only just enough for the current source to function properly. This is done to minimize power dissipation in the LED driver. If this lower level is regulated to the average of the target level, the lower portions of the ripple are below the target and they push the current source into its linear region of operation. This will get worse as the load current and ESR increase and also if the number of LEDs increases thus increasing the inductor current. To solve this, the target voltage must be raised to guarantee that it does not affect operation. This is difficult to do in practice and will result in the headroom for the current sources being set higher than required to guarantee that there is never a problem, increasing potential power dissipation in cases where it is not needed.

FIG. 8 illustrates a boost converter providing a new method for applying the feedback signal at the FB pin to the input of the integrator 402. The input of the FB pin which is normally fed to both the integrator 402 and the voltage feedback term in the control loop of the summation circuit 416 in the control loop is sampled and held by a switch 802 on the input to the integrator 402. By sampling and holding this voltage when the switching node is at a logical "low" level at the output queue of flip-flop 418, the integrator 402 sets the regulation point to the lowest point in the output ripple wave form. This allows the portions in the wave form to align with the reference voltage. This means that the headroom of the current source can be set to a much lower level while guaranteeing that ripple will not be able to push the current sources into their linear regions of operation.

Figure 9A:
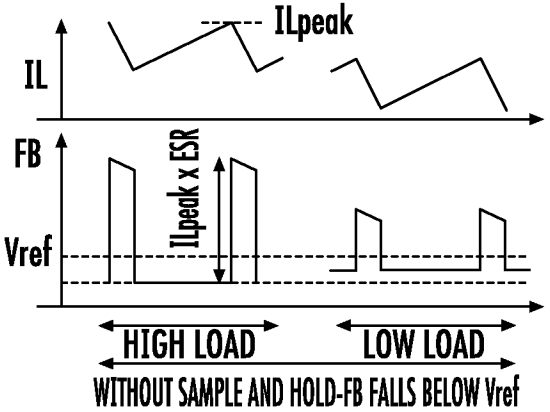
FIGS. 9a and 9b disclose wave forms illustrating operation of the circuit of FIG. 8 both with and without the use of sample and hold circuitry.
Figure 9B:
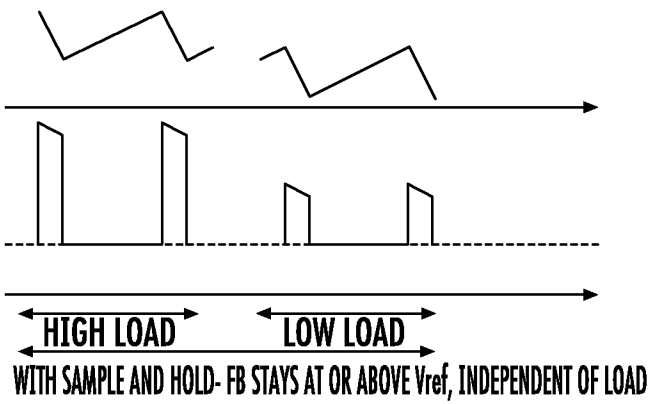

Referring now to FIGS. 9a and 9b, there are illustrated the inductor current $I_L$ and reference voltage feedback (FB) waveforms with respect to a circuit not using the sample and hold switch (FIG. 9a) and a circuit using the sample and hold switch (FIG. 9b). When the sample and hold circuit is not used, the feedback voltage falls below the reference voltage $V_{REF}$ at a number of points during operation. FIG. 9b illustrates the use of a sample and hold circuit and the feedback voltage FB remains above the reference voltage $V_{REF}$ at all times independent of the provided load current $I_L$.

The boost regulator produces the minimal voltage needed to enable the LED string 204 with the highest forward voltage drop to run at the programmed current. The circuit employs a current mode control boost architecture that has a fast current sense loop and a slow voltage feedback loop. This architecture achieves a fast transient response that is essential for notebook backlit applications where the power can be a serious drain on batteries or instantly charged to an AC/DC adaptor without rendering noticeable visual nuisance. The number of LEDs that can be driven by the circuit depends on the type of LED chosen by the application.

The circuit is capable of boosting up to 34.5 volts and driving 9 LEDs in series for each channel. However, other voltage boost levels and numbers of LEDs may be supported in alternative embodiments. The dynamic headroom control circuit controls the highest forward voltage LED stack or effectively the lowest voltage from any of the input current pins. The input current pin at the lowest voltage is used as a feedback signal for the boost regulator. The boost regulator drives the output to the correct levels such that the input current pin at the lowest voltage is at the target headroom voltage. Since all of these LED strings are connected to the same output voltage, the other input current pins will have a higher voltage, but the regulated current source on each channel will ensure that each channel has the same programmed current. The output voltage will regulate cycle by cycle and is always referenced to the highest forward voltage string in the architecture.

It will be appreciated by those skilled in the art having the benefit of this disclosure that this LED driver provides an improved operating characteristic when driving LED strings in multiple channels. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A circuit for generating an output voltage to a top node of a plurality of LED strings, comprising:

an inductor having a load current flowing therethrough;

a switching transistor responsive to a switching control signal;

an integrator for generating a compensation voltage responsive to a voltage at a bottom node of an LED string and a reference voltage;

circuitry for combining an offset with the compensation voltage responsive to the compensation voltage and the load current through the inductor, wherein the offset is created only during a step load change of the load current and substantially reduces voltage transients from the compensation voltage and the output voltage;

a summation circuit for summing the compensation voltage including the offset with at least the voltage at the bottom node of the LED string to generate a first control signal;

a latch for generating the switching control signal responsive to the first control signal and a leading edge blanking signal.

2. The circuit of claim 1, wherein the circuitry for combining further comprises:

control logic for generating the offset responsive to the compensation voltage and the step load change of the load current; and an adder circuit for adding the offset to the compensation voltage to substantially reduce the voltage transients.

3. The circuit of claim 2, wherein the control logic further comprises:

circuitry for implementing a control algorithm for generating a digital value of the offset responsive to the compensation voltage and the step load change of the load current; and a digital to analog converter for generating the offset in analog format responsive to the digital value of the offset.

4. The circuit of claim 1, wherein the summation circuit further sums the compensation value, the voltage at the bottom node of the LED string, a slope compensation ramp signal and a current sense signal to generate the first control signal.

5. The circuit of claim 1, wherein basic loop properties of the circuit remain unchanged in each load condition.

6. The circuit of claim 1 further including a sample and hold circuit between the integrator and the bottom node of the LED string.

7. A circuit for generating an output voltage to a top node of a plurality of LED strings, comprising:

an inductor having a load current flowing therethrough;

a switching transistor responsive to a switching control signal;

an integrator for generating a compensation voltage responsive to a voltage at a bottom node of [the] *an* LED string and a reference voltage;

circuitry for implementing a control algorithm for generating a digital value of an offset responsive to the compensation voltage and a step load change of the load current;

a digital to analog converter for generating the offset in analog format responsive to the digital value of the offset;

an adder circuit for adding the offset to the compensation voltage to substantial reduce the voltage transients from the compensation voltage and the output voltage;

a summation circuit for summing the compensation voltage including the offset with at least the voltage at the bottom node of the LED string to generate a first control signal; and a latch for generating the switching control signal responsive to the first control signal and a leading edge blanking signal.

8. The circuit of claim 7, wherein the summation circuit further sums the compensation value, the voltage at the bottom node of the LED string, a slope compensation ramp signal and a current sense signal to generate the first control signal.

9. The circuit of claim 7, wherein the basic loop properties of the boost regulator remain unchanged in each load condition.

10. The circuit of claim 7 further including a sample and hold circuit between the integrator and the bottom node of the LED string.

11. A method for generating an output voltage to a top node of a plurality of LED strings, comprising the steps of:

generating a compensation voltage responsive to a voltage at a bottom node of an LED string and a reference voltage;

generating an offset voltage only during a step load change of the load current;

combining the offset voltage with the compensation voltage, wherein the offset voltage substantially reduces voltage transients from the compensation voltage and the output voltage;

summing the compensation voltage including the offset *voltage* with at least the voltage at the bottom node of the LED string to generate a first control signal;

generating a switching control signal responsive to the first control signal and a leading edge blanking signal; and generating the output voltage responsive to an input voltage and the switching control signal.

12. The method of claim 11, wherein the step of combining further comprises the step of adding the offset *voltage* to the compensation voltage to substantially reduce the voltage transients.

13. The method of claim 11, wherein the step of generating an offset *voltage* further comprises the steps of:

generating a digital value of the offset *voltage* responsive to the compensation voltage and the step load change of the load current with a control algorithm; and converting the digital value of the offset *voltage* into [the offset in] *an* analog format.

14. The method of claim 11, wherein the step of summing further comprises the step of summing the compensation value, the voltage at the bottom node of the LED string, a slope compensation ramp signal and a current sense signal to generate the first control signal.

15. The method of claim 11 further including the step of maintaining the basic loop properties of a boost regulator unchanged in each load condition.

16. The method of claim 11 further including the step of sampling and holding the voltage at the bottom node of the LED string used to generate the compensation voltage.

17. A method for generating an output voltage to a top node of a plurality of LED strings, comprising the steps of:

generating a compensation voltage responsive to a voltage at a bottom node of an LED string and a reference voltage;

generating an offset voltage only during a step load change of the load current;

combining the offset voltage with the compensation voltage, wherein the offset voltage substantially reduces voltage transients from the compensation voltage and the output voltage;

summing the compensation voltage including the offset *voltage* with at least the voltage at the bottom node of the LED string to generate a first control signal, wherein the step of summing further comprises the step of summing the compensation value, the voltage at the bottom node of the LED string, a slope compensation ramp signal and a current sense signal to generate the first control signal;

generating a switching control signal responsive to the first control signal and a leading edge blanking signal; and generating the output voltage responsive to an input voltage and the switching control signal.

*18. A circuit for generating an output voltage to a top node of a plurality of LED strings, comprising:*

*an inductor having a load current flowing therethrough;*

*a switching transistor responsive to a switching control signal;*

*an integrator for generating a compensation voltage responsive to a voltage at a bottom node of an LED string and a reference voltage;*

*circuitry for combining a correction offset with the compensation voltage responsive to the compensation voltage and the load current through the inductor, wherein the offset is created only during a step load change of the load current and substantially reduces voltage transients from the compensation voltage and the output voltage;*

*a summation circuit for summing the compensation voltage including the correction offset with at least the voltage at the bottom node of the LED string to generate a first control signal; and*

*a latch for generating the switching control signal responsive to the first control signal and a leading edge blanking signal.*

*19. The circuit of claim 18, wherein the circuitry for combining further comprises:*

*control logic for generating the correction offset responsive to the compensation voltage and the step load change of the load current; and*

*an adder circuit for adding the correction offset to the compensation voltage to substantially reduce voltage transients on the compensation voltage and the output voltage.*

*20. The circuit of claim 19, wherein the control logic further comprises:*

*circuitry for implementing a control algorithm for generating a digital value of the correction offset responsive to the compensation voltage and the step load change of the load current; and*

*a digital to analog converter for generating the correction offset in analog format responsive to the digital value of the correction offset.*

*21. The circuit of claim 18, wherein the summation circuit further sums the compensation value, the voltage at the bottom node of the LED string, a slope compensation ramp signal and a current sense signal to generate the first control signal.*

*22. A circuit for generating an output voltage to a top node of a plurality of LED strings, comprising:*

*an inductor having a load current flowing therethrough;*

*a switching transistor responsive to a switching control signal;*

*an integrator for generating a compensation voltage responsive to a voltage at a bottom node of an LED string and a reference voltage;*

*circuitry for implementing a control algorithm for generating a digital value of a correction offset responsive to the compensation voltage and a step load change of the load current;*

*a digital to analog converter for generating the correction offset in an analog format responsive to the digital value of the correction offset;*

*an adder circuit for adding the correction offset in the analog format to the compensation voltage to substantially reduce the voltage transients from the compensation voltage and the output voltage;*

*a summation circuit for summing the compensation voltage including the correction offset with at least the voltage at the bottom node of the LED string to generate a first control signal; and*

*a latch for generating the switching control signal responsive to the first control signal and a leading edge blanking signal.*

*23. The circuit of claim 22, wherein the summation circuit further sums the compensation value, the voltage at the bottom node of the LED string, a slope compensation ramp signal and a current sense signal to generate the first control signal.*

*24. A method for generating an output voltage to a top node of a plurality of LED strings, comprising:*

*generating a compensation voltage responsive to a voltage at a bottom node of an LED string and a reference voltage;*

*generating a correction offset voltage;*

*combining the correction offset voltage with the compensation voltage, wherein the correction offset voltage substantially reduces voltage transients from the compensation voltage and the output voltage;*

*summing the compensation voltage including the correction offset voltage with at least the voltage at the bottom node of the LED string to generate a first control signal;*

*generating a switching control signal responsive to the first control signal and a leading edge blanking signal; and*

*generating the output voltage responsive to an input voltage and the switching control signal,*

*wherein the generating a correction offset voltage further comprises:*

*generating a digital value of the correction offset voltage responsive to the compensation voltage and a step load change of the load current with a control algorithm; and*

*converting the digital value of the correction offset voltage into an analog format.*

*25. The method of claim 24, wherein the combining further comprises adding the correction offset voltage to the compensation voltage to substantially reduce the voltage transients.*

*26. The method of claim 24, wherein the summing further comprises summing the compensation value, the voltage at the bottom node of the LED string, a slope compensation ramp signal and a current sense signal to generate the first control signal.*

*27. A method for generating an output voltage to a top node of a plurality of LED strings, comprising:*

*generating a compensation voltage responsive to a voltage at a bottom node of an LED string and a reference voltage;*

*generating a correction offset voltage only during a step load change of the load current;*

*combining the correction offset voltage with the compensation voltage, wherein the correction offset voltage substantially reduces voltage transients from the compensation voltage and the output voltage;*

*summing the compensation voltage including the correction offset voltage with at least the voltage at the bottom node of the LED string to generate a first control signal, wherein the summing further comprises summing the compensation value, the voltage at the bottom node of the LED string, a slope compensation ramp signal and a current sense signal to generate the first control signal;*

*generating a switching control signal responsive to the first control signal and a leading edge blanking signal; and*

*generating the output voltage responsive to an input voltage and the switching control signal.*

* * * * *